United States Patent
Reynolds

(12) United States Patent     (10) Patent No.: US 11,281,302 B2
Reynolds     (45) Date of Patent: Mar. 22, 2022

(54) GESTURE BASED DATA CAPTURE AND ANALYSIS DEVICE AND SYSTEM

(71) Applicant: Steven Reynolds, Chicago, IL (US)

(72) Inventor: Steven Reynolds, Chicago, IL (US)

( * ) Notice: Subject to any disclaimer, the term of this patent is extended or adjusted under 35 U.S.C. 154(b) by 0 days.

(21) Appl. No.: 16/410,532

(22) Filed: May 13, 2019

(65) Prior Publication Data

US 2019/0354191 A1    Nov. 21, 2019

Related U.S. Application Data

(60) Provisional application No. 62/673,199, filed on May 18, 2018, provisional application No. 62/673,214, filed on May 18, 2018.

(51) Int. Cl.
*G06F 3/01* (2006.01)
*G06F 3/0346* (2013.01)

(52) U.S. Cl.
CPC .......... *G06F 3/017* (2013.01); *G06F 3/0346* (2013.01); *G06F 2203/0331* (2013.01)

(58) Field of Classification Search
CPC ........ G06F 3/017; G06F 3/0346; G06F 3/014; G06F 2203/0331; G06F 2203/04101; G06F 3/04883; G06F 1/163; G06F 3/0426; G06F 3/041–048; G06F 2203/00–04809; G06F 9/451; G06F 2203/04808; G06K 9/00355; G06K 9/00335; G06K 9/00389; G06K 9/00342
See application file for complete search history.

(56) References Cited

U.S. PATENT DOCUMENTS

| | | | | |
|---|---|---|---|---|
| 9,207,759 | B1* | 12/2015 | El Dokor | G06T 3/4015 |
| 2005/0212760 | A1* | 9/2005 | Marvit | G06F 3/0236 |
| | | | | 345/156 |
| 2008/0170748 | A1* | 7/2008 | Albertson | G06F 3/017 |
| | | | | 382/103 |
| 2011/0182471 | A1* | 7/2011 | Reznik | G06F 3/017 |
| | | | | 382/103 |
| 2011/0216209 | A1* | 9/2011 | Fredlund | G06F 3/017 |
| | | | | 348/211.99 |
| 2012/0239396 | A1* | 9/2012 | Johnston | H04N 21/47 |
| | | | | 704/235 |
| 2013/0335640 | A1* | 12/2013 | Watanabe | G06F 3/005 |
| | | | | 348/744 |

(Continued)

*Primary Examiner* — Sanjiv D. Patel

(57) ABSTRACT

A gesture based data capture and analysis system includes one or more gesture units and an analysis unit. The gesture units are affixed to a user's hand and/or one or more fingers. The gesture units contain a gesture sensor such as one or more motion detectors (e.g., accelerometers or an image analysis unit) and communicate with an analysis unit and one or more peripherals, such as a mobile phone, camera, video recorder, audio recorder, or other analog or digital sensing unit. The gesture units sense movement of a user's arms, hands, and/or fingers as gesture data. The analysis unit interprets the gesture data and controls the capture of image, audio, video, and/or other data by the peripherals and the processing, storing, sending, networking, posting, display, and/or publishing of the captured data according to processing gestures captured by the gesture units as gesture data and interpreted as such by the analysis unit.

27 Claims, 5 Drawing Sheets

(56) References Cited

U.S. PATENT DOCUMENTS

| | | | |
|---|---|---|---|
| 2015/0229837 A1* | 8/2015 | Her | H04N 5/23219 |
| | | | 348/222.1 |
| 2015/0253847 A1* | 9/2015 | Harris | G06F 3/017 |
| | | | 345/156 |
| 2015/0309582 A1* | 10/2015 | Gupta | G06F 3/017 |
| | | | 345/156 |
| 2015/0346899 A1* | 12/2015 | Jung | G06F 3/1423 |
| | | | 345/173 |
| 2017/0076415 A1* | 3/2017 | Ng-Thow-Hing | G02B 27/01 |
| 2017/0336963 A1* | 11/2017 | Lee | G06F 3/0412 |
| 2018/0376043 A1* | 12/2018 | Schannath | G03B 29/00 |

* cited by examiner

| ID | Compatibility | Path | Action |
|---|---|---|---|
| C1 | a | 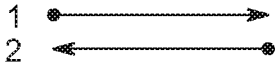 | Capture image |
| C2 | a |  | Capture audio |
| C3 | a |  | Capture video |
| ... | | | |
| CN | b | Custom path | Capture at other sensor |
| P1 | a, b | 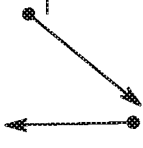 | Process capture file and store without raw data |
| P2 | a | 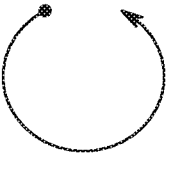 | Process gesture file and send to preset device or website |
| P3 | a, b |  | Process most recently capture data for display on analysis unit |
| ... | | | |
| PN | ... | Custom pata | Custom processing capture image and sensor |
| ... | | | |
| SN | ... | C1, CN | |

GESTURE BASED DATA CAPTURE AND ANALYSIS DEVICE AND SYSTEM

CROSS-REFERENCE TO RELATED APPLICATIONS

This application claims priority from U.S. Provisional Application No. 62/673,199 filed on May 18, 2018, and to U.S. Provisional Application No. 62/673,214 files on May 18, 2018.

BACKGROUND OF THE INVENTION

Mobile user electronics (such as mobile phones, digital video and audio recorders, and other sensors) allow users to capture, store, process, transmit, and display information around them. However, executing these actions using one or more peripherals can be cumbersome for a user; often it involves a user pulling out a device and interacting with buttons or a keyboard, which confines the user's attention.

BRIEF SUMMARY OF THE INVENTION

The present invention relates to a gesture based data capture and analysis system. In one embodiment, a handheld or wearable gesture unit is affixed to or carried by a user. The gesture unit contains a gesture-sensor, such as one or more motion detectors (e.g., accelerometers or an image analysis device), and communicates with one or more peripherals and an analysis unit. "Peripheral" means a device or sensor (such as a camera, video recorder, audio recorder, or other analog or digital sensing unit, including a mobile device that contains peripherals of its own) that is capable of capturing data that can be stored in memory. The gesture unit senses movement of a user's arms, hands, and/or fingers. In one embodiment, a gesture unit is worn on the front of a user's wrist (the palm side) and contains a camera and microphone as well as motion detectors (e.g., accelerometers). In this embodiment, after the user completes a gesture with the user's palm facing away from his or her body, the camera and microphone are in position (aimed at) the sound, imagery, or other data to be captured.

The gesture unit is electrically connected to ("connected" meaning directly or indirectly connected, intermittently or continuously connected, or by physical connection or wireless connection) the analysis unit, which contains a processor capable of running software code, memory, input/output port, network interface (e.g., a wireless network adapter, cellular communication device or baseband chip, USB, Bluetooth, or near field communication device). The gesture unit and the analysis unit may be included in the same housing or be connected wirelessly or by wire. In response to gestures by a user, the gesture unit detects the gesture as gesture data and sends the gesture data to the analysis unit. The analysis unit responds depending upon what gesture ID corresponds to the gesture data. For example, if the gesture data corresponds to a request to capture data (e.g., image, audio, or video capture), the analysis unit causes one or more peripherals to capture data. The analysis unit stores the captured data (e.g., image, audio, or video) in memory as a capture file, to which it appends gesture information or other processing information or instructions to create a gesture file. "File" means any set of data stored in memory that is appended together. This includes, for example, data sets or databases that are distributed across different networks or servers. "Append" means that two or more data are associated or related in a way that a CPU can interpret or recognize the association; to the extent it is necessary to delete or alter current data in order to successfully "append" new data, such actions are encompassed by the term "append."

The analysis unit appends to the capture file information related to the circumstances in which each set of data was captured; such as, for example, information related to the user's position at the time of capture and information that results from further processing by the analysis unit. In another embodiment, the analysis unit processes the gesture file (or the original capture file) to determine whether the captured data constitutes or comprises one or more of an image, video, audio, text, speech, song or other recognizable category(ies) of data. In another embodiment, the analysis unit processes the capture file based upon the category(ies) of information received. For example, if an image is detected, the analysis unit determines whether a person's face or persons' faces are depicted in the image, whether the image is two-dimensional (e.g., an image of a text-based document), or other data or image processing known in the art. As another example, if an audio file is detected, the analysis unit determines whether the audio contains speech, music or lyrics, or other type of noise, vibration, or sensory input. If speech is detected, the analysis unit converts the speech to text using known speech recognition algorithms. If music or lyrics are detected, the analysis unit recognizes the song or music using known techniques. The foregoing information, as processed by the analysis unit, is appended to the capture file to create a gesture file; or, if a gesture file has already been created, the analysis unit modifies the gesture file as needed by appending processed information to the file (which includes, if necessary, removing or altering other information in it).

In other embodiments, the gesture unit, in connection with the analysis unit, interprets sequence gestures, combined gestures, timing gestures, speed gestures, contrasting gestures, handshake gestures, relational gestures, and/or complex gestures. For example, one gesture (e.g., a lateral motion of one of a user's hands across the body, back and forth) may be detectable by the gesture unit and, when detected, is sent to the analysis unit as gesture data and interpreted by the analysis unit as a request to capture an image. Upon receipt of the gesture data, the analysis unit sends a signal to a camera peripheral to capture an image. Another, subsequent gesture (e.g., moving a user's hand in a counter-clockwise, 360 degree circular motion starting at midnight) is detectable by the gesture unit and, when detected, is sent to the analysis unit as gesture data, and interpreted by the analysis unit as a request to send the captured image to a website. Upon receipt of that gesture data, the analysis unit sends the image to a web site for publishing. Alternatively, if a public display gesture is detected, the image is sent to a public display screen(s).

In another embodiment, two or more gesture units are used to create more options for gestures. For example, in one embodiment, a user wears one gesture unit on each hand and additional gesture units on two fingers on each hand. When finger gesture units are used, the gestures created by the user's fingers can be used, for example, to send a command to initiate gesture sensing and/or to cancel capture. For example, in one embodiment, a user moves his or her third (middle) finger quickly in toward his or her palm to instruct the gesture unit to start recording or attempting to detect gesture data. Alternatively, this finger-to-palm gesture instructs the analysis unit to start interpreting ("listening" to) gesture data output by one or more gesture units—so as to save processing power when the user does not intend gestures to be interpreted or acted upon. These options also prevent erroneous capture gestures from being detected or interpreted.

Alternatively, the finger-to-palm gesture can be used initiate a photo capture or other capture. This embodiment is particularly advantageous to users who wish to quickly capture data with minimal movement of the extremities.

In one embodiment, finger gestures are used to control the method of capture; such as, for example, controlling zoom or focus during image or video capture, directional audio capture, or other capture criteria. In one embodiment, a serial photo gesture is used (e.g., three swipes of the hand back and forth—similar to gesture C1 in FIG. 3 but with a third motion back to the right) to instruct a camera peripheral to capture a number of photos in seriatum, while opening and closing of the user's fingers controls the zoom level as each photo is taken (e.g., closing fingers might indicate zooming in before the next photo capture in the series and opening fingers might indicate zooming out before the next photo capture in the series). The same zooming in and out feature applies to video captures. In another embodiment, finger gestures (e.g., tapping two fingers together) indicates that the user intends to photograph an image with text for OCR (e.g., if a user desires to photograph a document or business card) or an image to be decoded (e.g., a bar code or QR code). Similarly, if a directional microphone or audio sensor is connected, moving the fingers in and out can be used to control the depth or sensitivity of audio detection.

BRIEF DESCRIPTION OF THE DRAWINGS

FIG. 3 shows an exemplary gesture database with gesture-ID column, compatibility identifier, gesture path, and action description.

DETAILED DESCRIPTION OF THE INVENTION

Figure 1:
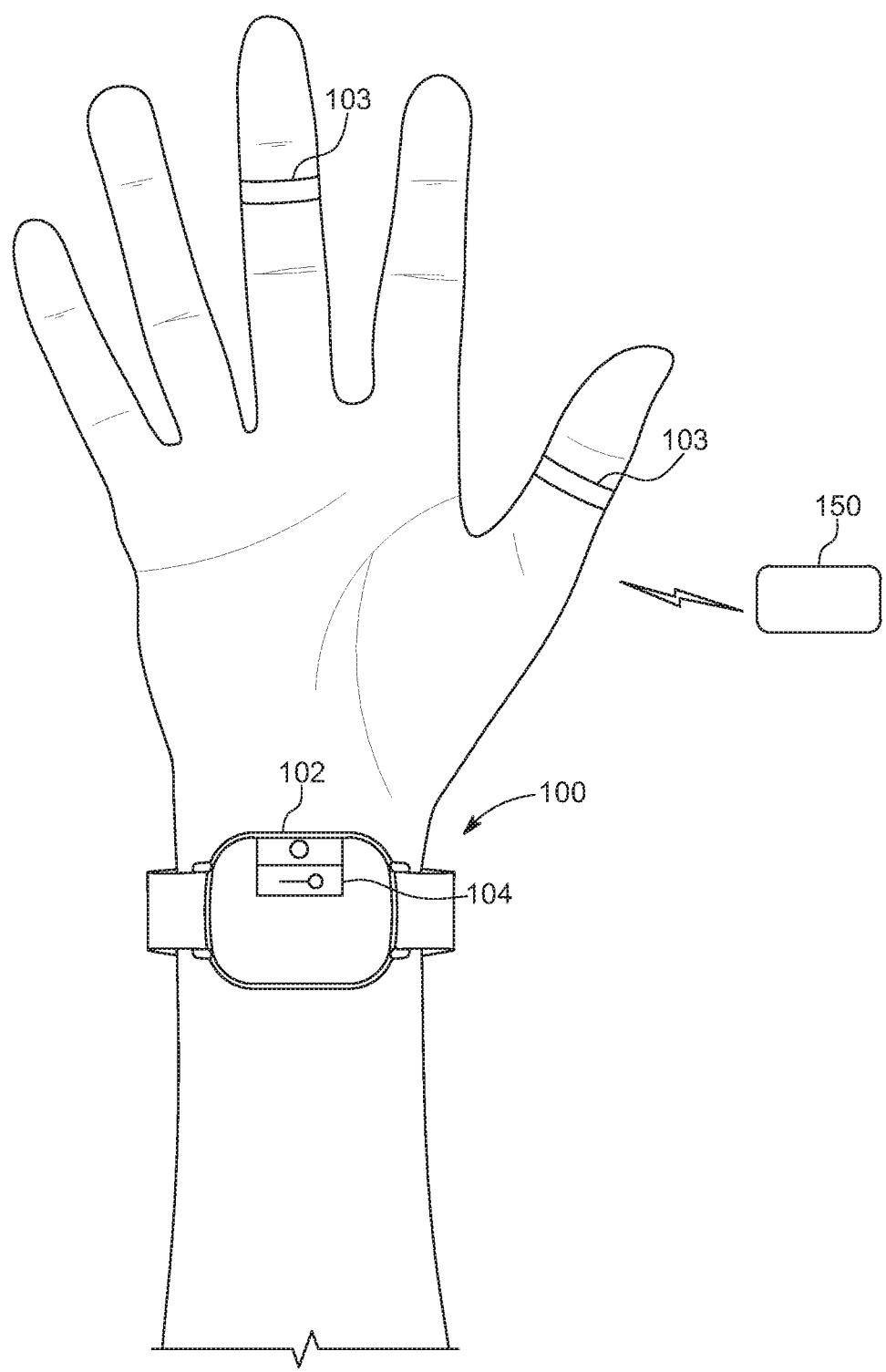
FIG. 1 depicts the outer portion of one embodiment of a gesture unit and analysis unit of the gesture based data capture and analysis system.

FIG. 1 depicts the outer portion of one embodiment of a gesture unit 100 and analysis unit 150 of the gesture based data capture and analysis system—or Gesture-Based System ("GBS") for short. The gesture unit is shown attached to the wrist of a user where the user's palm faces out of the page. In this embodiment, the gesture unit contains a camera 102 and microphone 104. The analysis unit is carried by or affixed to a user; in one embodiment, it can be affixed behind the gesture unit (such as, for example, on the back side of the user's wrist). In one embodiment, the analysis unit includes an audio codec associated with the microphone and a camera codec, image codec, and/or a video codec associated with the camera. The GBS of FIG. 1 also includes additional optional gesture units 103 (which each include at least one or more accelerometers, a power source, a logic unit or processor, and a transmitter—similar to those components described in connection with the gesture unit 150 in FIG. 2 except, in some embodiments, without the peripheral camera, sensor, or mic); in one embodiment, an optional gesture unit is affixed to the thumb and third finger (middle finger).

Figure 2:
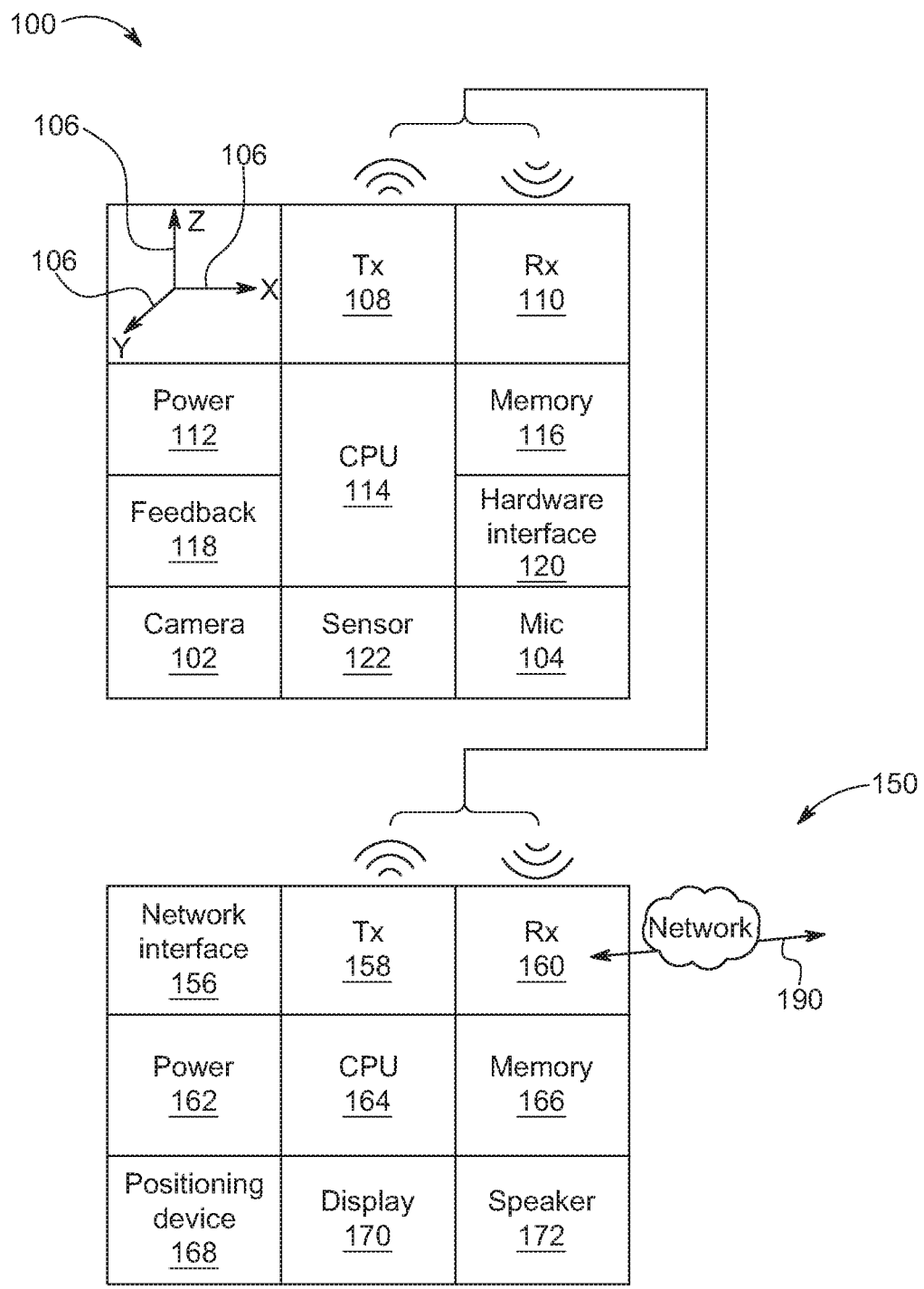
FIG. 2 is a block diagram the components of one embodiment of the gesture-based data capture and analysis system.

In another embodiment, the gesture unit detects gestures and sends gesture data to the analysis unit, all processing is done by the analysis unit, and all capture is controlled by the CPU of the analysis unit (see FIG. 2).

FIG. 2 is a block diagram of one embodiment of the GBS. In this embodiment, the GBS includes a gesture unit 100, which contains three orthogonal accelerometers 106(x), 106(y), and 106(z) transmitter 108, receiver 110, power supply 112, CPU 114, memory 116, feedback mechanism 118, hardware interface 120, and optional additional peripheral(s) or sensor(s) 122. It will be understood that the accelerometers can be translational accelerometers, gyroscopes, or any type of motion detecting device or sensor. Any number or arrangement of accelerometers or other motion detectors can be used—depending upon the nature and number of gestures sought to be detected and interpreted. For example, in an alternative embodiment, a motion capture device, such as one or more cameras, or a multi-angle camera (see, e.g., U.S. Patent Application Ser. No. 20110006991, which is incorporated herein by reference) connected to an image processor may be affixed to the palm or wrist of a user to record the movement of the user's fingers; or motion detection devices may be affixed to one or more of the user's fingers or other part of the body (see, e.g., U.S. Patent Application Ser. No. 20040263473, which is incorporated herein by reference). The transmitter is preferably a radio transmitter that transmits message packets wirelessly. The receiver is preferably a radio receiver that receives message packets wirelessly. The term "CPU" shall be broadly construed to include one or more digital microprocessors, field programmable gate arrays (FGPAs), or any kind of digital or analog logic device, whether centralized or distributed.

The CPU 114 is electrically connected to the camera 102, mic 104, accelerometers 106, transmitter 108, receiver 110, power supply 112, CPU 114, memory 116, feedback mechanism 118, hardware interface 120, and one or more optional peripherals or sensors 122. In one embodiment, the power supply is a rechargeable battery. Optional sensors may include any measuring or sensing device such as, for example, temperature or pressure sensor, motion sensor, heat or infrared sensor, or any other analog or digital sensing device. If the sensor operates in the analog domain, one or more analog-to-digital converters and coding/decoding devices may be used to convert the readings into digital format before being sent to the CPU. Alternatively, a separate conversion unit may be provided between the sensor and the CPU or as part of the CPU.

The accelerometers 106(x), 106(y), and 106(z) detect movement of the gesture unit; those movements are interpreted by the CPU 114, using known methods, such as, for example, those disclosed in U.S. Patent Application Publication No. 20110199292A1 (application Ser. No. 12/707,799); U.S. Application Publication No. 20080013826; U.S. Pat. Nos. 6,804,396; 6,990,639; and/or 8,819,812—each of which is incorporated herein by reference.

With continued reference to FIG. 2, the analysis unit includes a network interface 156, transmitter 158, receiver 160, power supply 162, CPU 164, memory 166, positioning device 168 (such as a GPS receiver or other global or intertial positioning device), display 170, and speaker 172. The CPU 164 is electrically connected to the network interface 156, transmitter 158, receiver 160, power supply 162, memory 166, positioning device 168, display 170, and speaker 172. In one embodiment, the analysis unit is capable of connecting to one or more networks 190 (e.g., the Internet), such as, for example, by using the transmitter 158 and receiver 160 or the network interface 156. The gesture unit and the analysis unit communicate via signals from the transmitter 108 to receiver 160 and via transmitter 158 to receiver 110. The communications are preferably wireless, but could also be wired (e.g., via a bus or USB connection). Any number of known wireless communications standards capable of sending and receiving information or data packets can be used—such as, for example, broadcast AM or FM radio, microwave communication, Wi-Fi, Bluetooth, Bluetooth Low Energy, NFC, Zigbee, WiMax, IrDA, technologies listed by the Institute of Electrical and Electronics Engineers (IEEE) for machine-to-machine (M2M) communication (e.g., IEEE 802 technologies).

The display 170 can be a standard mobile display, such as those used on mobile phones. Alternatively, smaller, simpler, lower-resolution, less expensive, and/or lower powered displays can be used such as, for example, to reduce battery consumption.

In one embodiment, the accelerometers 106(*x*), 106(*y*), and 106(*z*) of the gesture unit 100 detect motion as gesture data. The CPU 114 sends the gesture data to the transmitter 108, which transmits the gesture data to the receiver 160 of the analysis unit. The CPU 164 of the analysis unit interprets the gesture data to determine the path of the gesture unit, as known in the art and disclosed in the above-cited references. The CPU stores the identity of the gesture path in memory. In one embodiment, the paths are stored in a database or lookup table and referenced by alphanumerical or numerical identifications, such as those displayed in FIG. 3.

FIG. 3 shows an exemplary gesture database with gesture-ID column 302, compatibility identifier 303, gesture path 304, and associated action 306. The ID column provides an alphanumeric or numeric identifier of the gesture. These IDs classify or categorize gestures and/or associate one or more gestures together. The compatibility identifier 303 checks whether gestures are compatible with one another. In the example shown in FIG. 3; C1, C2, and C3 are compatible with processing gestures P1, P2, and P3 (as each include the designation "a")—meaning the CPU will execute those gestures in sequence. The CN gesture shown is only compatible with processing gestures P1 and P3 (as the CN, P1 and P3 gestures include designation "b," while processing gesture P2 does not include the designation "b"). Thus, if a user initiates gesture CN followed by gesture P2, the latter will be ignored and/or the user will be alerted by a sound, icon, haptic feedback, or other altering means indicating that the gestures in sequence are not compatible. In terms of IDs, for example, the "C" in FIG. 3 identifies the gesture as a capture-based gesture; "P" identifies a processing-based gesture; and "S" identifies a sequence of gestures. As described above, any number of gesture types can be stored, referenced, or associated together. The gesture path column shows the motion of the gesture in one exemplar embodiment. The gesture paths in this example are shown in two dimensions, but it will be understood that gestures can be defined in multiple dimensions, such as three lateral dimensions and/or time (e.g., how long between successive motions), speed, acceleration, or other dimensions. Finger gesture paths are not shown, but it will be understood that any number of finger gesture paths can be included in the table—in any of the aforementioned dimensions—as well. The action column describes the action for the analysis unit to take. The listed actions are programmed into software readable by the CPU.

When the CPU 164 interprets gesture data as associated with capturing an image (e.g., gesture ID C1 in FIG. 3), the CPU 164 instructs the camera 102 to capture an image, and the CPU 164 saves that image into memory 166 as an image capture file (e.g., JPEG, PDF, TIFF, DNG, CR2, NEF, ARW, or other format). In one embodiment, the gesture unit 100 further includes a feedback device 118 for informing the user that a function (e.g., image capture) has been carried out. Feedback device 118 is controlled by instructions from CPU 164 to CPU 114 but can also be controlled by either CPU separately or in combination. The feedback device can be a speaker that produces a sound, an LED, a display, a haptic feedback device, or any other device capable of providing signals to a user. In one embodiment, the feedback device provides a sound, light, flash, display, vibration or other like signal to a user when a gesture is detected by one or more gesture units and interpreted by the analysis unit. In another embodiment, the feedback device provides different signals to alert the user as to which type of gesture was detected and interpreted. It will also be understood that different combinations of feedback can be provided depending upon the number and type of gesture units. For example, if a user has gesture units on more than one fingers, haptic feedback can be provided on different fingers depending upon the error or process being executed. For example, a haptic response might alert the user that the analysis unit has recognized text or faces of individuals in an image captured (or to be captured). In this way, and any number of other similar arrangements, the GBS is able to communicate with the user without the user directing his or her visual attention or hearing attention away from the object being captured or sought to be captured. It will be understood that the analysis unit may perform any of the foregoing functions alone or in combination with the gesture unit.

Further, in an alternative embodiment, either the gesture unit or the analysis unit includes a user input (not shown) such as a button, switch, touchscreen soft button, or voice activated command by which the user can enable/disable gesture detection.

When the CPU 164 interprets gesture data as associated with recording audio (e.g., gesture ID C2 in FIG. 3), the CPU 164 instructs the microphone 104 to begin capturing audio until the CPU 164 detects a stopping gesture, such as, for example, a repeated gesture associated with recording audio (e.g., gesture ID C2 in FIG. 3). Alternatively, the stop gesture can be a universal stop or cancel gesture the applies to all capture functions (e.g., applies to C2 and C3, depending on which has been most recently activated). The CPU 164 then saves the captured audio into memory 166 as an audio capture file (e.g., WAV, MP3, or other format). In one embodiment, the CPU 164 includes an internal time function to write a date stamp and time stamp into the audio file stored in memory 166.

When the CPU 164 interprets gesture data as associated with recording video (e.g., gesture ID C3 in FIG. 3), the CPU 164 instructs the camera 102 to begin capturing video until the CPU 164 detects a stopping gesture, such as, for example, a repeated gesture associated with capturing video (e.g., gesture ID C3 in FIG. 3) or a tap of one of the user's fingers to the palm (if optional finger gesture units are used). Alternatively, the stop gesture can be a universal stop or cancel gesture the applies to all capture functions (e.g., applies to C2 and C3, depending on which has been most recently activated). It should be noted that the camera 102 may be comprised of a still image camera and separate video camera. However, combined digital still-image and video cameras are well known, including, for example, those included on mobile phones with image and video recording capability. The CPU 164 then saves the captured video into memory 166 as an audio capture file (e.g., AVI, FLV, WMV, MOV, MP4, or other format). The CPU preferably includes an internal time function to write a date stamp and time stamp into the video file stored in memory 166.

It shall be understood that capture files and/or gesture files can be saved in memory 116 alone, memory 166 alone, and/or in a combination of both. Alternatively, memory 116 and memory 166 can be the same memory device. It shall also be understood than any manner of distributed storage or cloud storage of files can be used.

ID CN and the ellipses that precede it indicate that any number of capture-based gestures and actions can be stored in the database and/or called upon by a user. ID PN and the ellipses that precede it indicate that any number of processing-based gestures can be stored in the database and/or called upon by a user.

When the CPU 164 interprets gesture data as associated with storing without raw images, audio, or video frames (e.g., gesture ID P1 in FIG. 3); the CPU 164 processes the most recently captured file for information and then deletes the original captured (raw) data. This function can be used to save storage space in memory or to limit the type of information stored—it is described in more detail above in connection with FIG. 3.

When CPU 164 interprets gesture data as associated with publishing or displaying captured data (e.g., gesture ID P2 or P3 shown in FIG. 3), it creates a capture file and stores it in memory 166. The CPU 164 then appends gesture data and instructions to the capture file to create a gesture file. The CPU 164 then displays, publishes, stores, and/or sends the file to be processed, displayed, published, and/or stored. For example, a user may initiate an image capture gesture to photograph a group of friends and then initiate a gesture associated with publishing the photo to a social media platform. As another example, a user may initiate an audio gesture to record someone's spoken telephone number or comments about a subject; initiate a store without raw images/audio gesture to transcribe the audio and then delete the raw audio data; and then initiate a gesture to send that transcribed audio it to an office document, contacts database, or other program that makes use of contact information. As another example, a user may initiate a photo gesture to photograph a group of individuals; initiate a store without raw images/audio gesture that will determine the identity of the individuals (e.g., by sending a downsampled version of the photo to a social media site capable of face recognition), store the identity of the individuals, and delete the raw image data; and then initiate a gesture to send the individual-identities (along with date, time, and location information) to an office document, contacts database, or program that makes use of contact information. As another example, a user may initiate a video gesture to record video of an event and then initiate a display gesture to send the image to either the display 170 of the analysis unit 150 or to a mobile phone to display the photo. The user may next initiate a gesture to publish the photo to a social media site.

In one embodiment, the processing of the gesture file takes place in the analysis unit 150, by the CPU 164 after the gesture file is sent by the transmitter 108 to receiver 160. In one embodiment, some or all of the capture file is displayed on display 170 (preferably a visual display) and/or speaker 172 of the analysis unit; such as, for example, on an analysis unit affixed to the user's, wrist, arm, ears, eyes, or other location. This processing includes, in one embodiment, detecting user position with positioning device 168 and appending position information to either the capture file or gesture file and/or updating location information in a gesture unit.

It will be understood that the gesture unit can be arranged to detect any number of gestures. Some examples of gesture-types include combined gestures (e.g., left-to-right and up-to-down could be combined into a upper-left-to-lower-right gesture), sequence gestures (e.g., left-to-right followed by up-to-down), contrasting gestures (e.g., using two gesture units, separating one's hands apart from one another or bringing them back together), speed gestures (e.g., quick left-to-right movement), timing gestures (e.g., tapping fingers quickly or pausing for a certain time or range of times between taps), handshake gestures (e.g., a gesture that is detected by one device and coordinates, through a wide area or local network or device-to-device communication, with another device to determine if a corresponding gesture has occurred) or a combination of the foregoing (e.g., a subsequent/contrasting/timing gesture such as up-to-down quickly followed by lower-left-to-upper-right slowly). Other gestures include complex gestures or relational gestures. For example sending a gesture file or other information to another user may include pulling one's wrist back over the shoulder and rapidly moving it forward, down, and across the body as if throwing a (figurative) ball in a specific direction, or bringing the user's hands together while closing the fingers to send an instruction to focus a camera at a projected intersection point of the hands while zooming in at an amount related to the rate at which the fingers close (or open, in the case of zooming out). In the case of the complex-relational, ball-throw gesture, the system may coordinate with another nearby device (e.g., over a wide area or local network or local device-to-device communication) to determine, for example, if a corresponding catch gesture (closing a user's fingers or palms and pulling back toward the user's body) before initiating publishing, sending, and/or other processing of information.

Any of the foregoing, in addition to any other type of gesture, can be arranged to control how the analysis unit processes the captured data or to where the data might be sent for publishing, display, or further processing. In one embodiment, a remote website or server (e.g., https://ifttt-.com) is used to control publishing, display, or further processing.

Any of the foregoing can use distributed transaction and/or storage technology (e.g., blockchain) to record, process, and/or coordinate gestures. In one embodiment, a user controls which gestures coordinate with a distributed and/or storage technology and which are kept private for the user. For example, in one embodiment, the GBS includes a gesture that instructs the analysis unit whether to publish (or, alternatively, keep private) a subsequent (or, alternatively, previous) gesture. In one embodiment, one or more of the gesture units or analysis units includes a button or other user interface to control that functionality. In an alternative embodiment, the CPU 164 automatically determines (e.g., in connection with user settings or profiles set up ahead of time) whether and which gestures are private or to be public.

In one embodiment, the gesture unit and/or the analysis unit includes an application programming interface (API) or other like software block or command string to communicate with other gesture devices, mobile phone, online profiles or applications, or other social media or communication applications. As one example, a user may initiate a public gesture while clapping at a concert. In such instance the gesture unit detects gesture data from the user clapping and sends that gesture data to CPU 164 via transmitter 108 and receiver 160; the CPU 164 interprets the gesture data as applause and creates a capture file to which it appends time and location information (to create a gesture file); the CPU 164 then uses the network interface to communicate with a social media API and/or events website containing information about the location of Concert A to publish a notification that the user is enjoying Concert A. Alternatively, a user may initiate a public gesture while making a thumbs-down motion to publish on a social media site that the user is not enjoying Concert A. As another example, a user may use the GBS to photograph a plate of food at Restaurant B and provide a star-based review (e.g., by using a number of clicks or the finger or number of claps of the user's hands). As another example, a user may use a hail-gesture (e.g., waiving one hand over the user's head) to send location information to a transportation website to request a ride.

Figure 4:
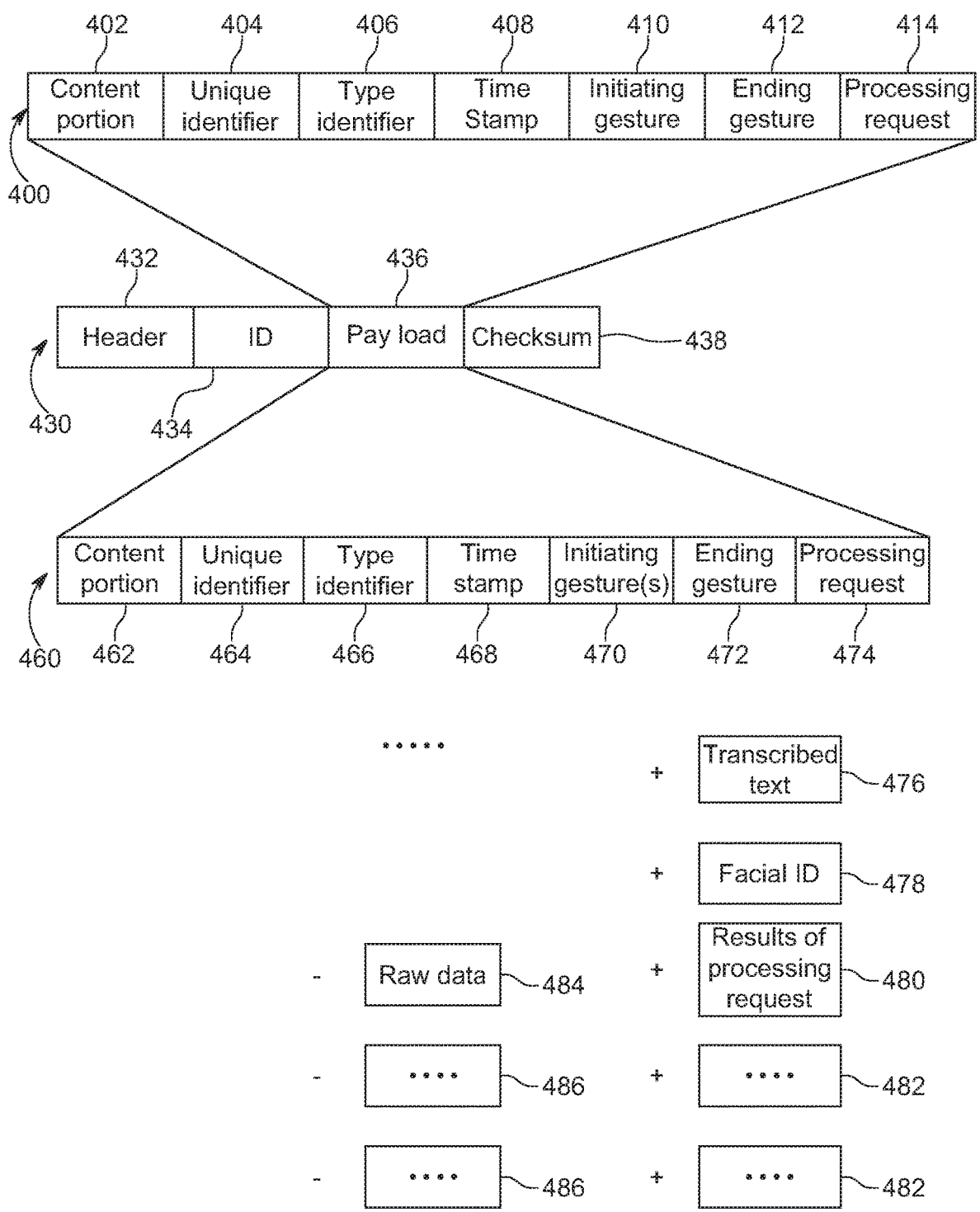
FIG. 4 shows one embodiment of how captured data is stored, transmitted, and processed.

FIG. 4 shows one embodiment of how gesture files are encoded (or modulated) for transmission and decoded (or demodulated) upon receipt. While FIG. 4 depicts a gesture file, it will be understood that the same process can be applied to capture files. Additionally, any known means of encoding/decoding and/or modulating/demodulating can be used. Reference 400 shows one embodiment of a gesture file store in memory 116 of the gesture unit 100. The gesture file contains content portion 402, which includes either the raw image data, raw audio data, raw video data, or other raw captured data. The gesture file also includes the unique identifier block 404, which contains information that identifies the captured data-set and distinguishes it from other data-sets. The gesture file also includes identifier block 406, which contains information that identifies the type of data captured (e.g., image, audio, or video). The capture file also includes the time stamp block 408, which contains information related to the date(s) and time(s) at which the capture occurred. Initiating gesture block 410 contains information that identifies the type of gesture that initiated the capture. The ending gesture block 412 contains information that identifies the type of gesture, if any, that ceased the captured (e.g., in the instance of audio or video capture). The processing request block 414 contains information that identifies what should be done with the gesture file or other information associated with the captured data (e.g., stored, processed, displayed, and/or sent to a remote server or website). By writing this information in the gesture file itself, the CPU 114 and CPU 164 (and any other logic device connected to CPU 114 and/or CPU 164) are able to share (or split, such as by parallel processing) the processing duties by writing what processing remains to be done into the file itself so that other logic units can interpret and execute remaining instructions.

Reference 430 shows one embodiment of a message packet format by which the transmitter 108 (and/or CPU 114) of the gesture unit 100 formats a gesture file for transmission to the receiver 160 of the analysis unit 150. The message packet includes a header 432, packet ID 434, payload 436, and checksum 438. In this embodiment, the header identifies the beginning of the message and number of bits included in the message; the ID identifies each individual message packet; the payload contains some or all of the gesture file and any associated data; and the checksum includes information the contents of a gesture file stored on the gesture unit and how it is converted into a message format (e.g., modulated or encoded) for transmission.

Reference 460 shows one embodiment of the gesture file stored in memory 166 of the analysis unit 150, after it has been assembled (e.g., decoded or demodulated) by the receiver 160 (and/or CPU 164) of the analysis unit 150. The gesture file contains content portion 462 (formerly content portion 402), unique identifier block 464 (formerly unique identifier block 404), identifier block 466 (formerly identifier block 406), time stamp block 468 (formerly time stamp block 408), initiating gesture block 470 (formerly initiating gesture block 410), ending gesture block 472 (formerly ending gesture block 412), and processing request block 474 (formerly processing request block 414). In alternative embodiments, either CPU 114 or CPU 164 (and any other logic device connected to CPU 114 and/or CPU 164) can add, remove, or modify blocks of data from the gesture file (or capture file).

References 476 (transcribed text), 478 (facial identification), 480 (results of processing request), and one or more appended information portion(s) 482 (any additional information to be associated with the file) show information that may be appended to the gesture file. References 484 (raw data, such as raw image, audio, or video, data) and one or more removed information portions 486 (any other captured data or appended data to be removed) show information that may be removed or deleted from either the gesture file. While FIG. 4 depicts the addition and/or removed taking place at the analysis unit, and such addition and/or removal can also take place at the gesture unit. In this way, any or all processing of the capture file or gesture file may be executed at one or more gesture units, analysis units, other connected or remote processing units, cloud processing units, or any combination of the foregoing. Thus the system is flexible in terms of distributing the processing load. For example, in the embodiment shown if FIG. 1, if the wrist-worn gesture unit 100 is of sufficient size that it can store a processor, large amount of memory, and sustainable battery, most or all of the processing can be accomplished by the CPU 114. However, in an alternative embodiment, where the only gesture units are smaller gesture units 103, the CPU of those gesture units might simply pass gesture data to the analysis unit 150. In such case, the analysis unit 150 will undertake most or all of the additional processing. Alternatively, in more sophisticated embodiments, the various processors can alter their processing loads throughout operation depending upon operational factors such as, for example, battery level of any of the gesture units or analysis units, which gesture is detected and interpreted, where various peripherals are located, etc. It will be understood that the system provides a great deal of flexibility in arranging various embodiments and distributing the processing demands throughout or across multiple gesture units and/or multiple analysis units.

Figure 5:
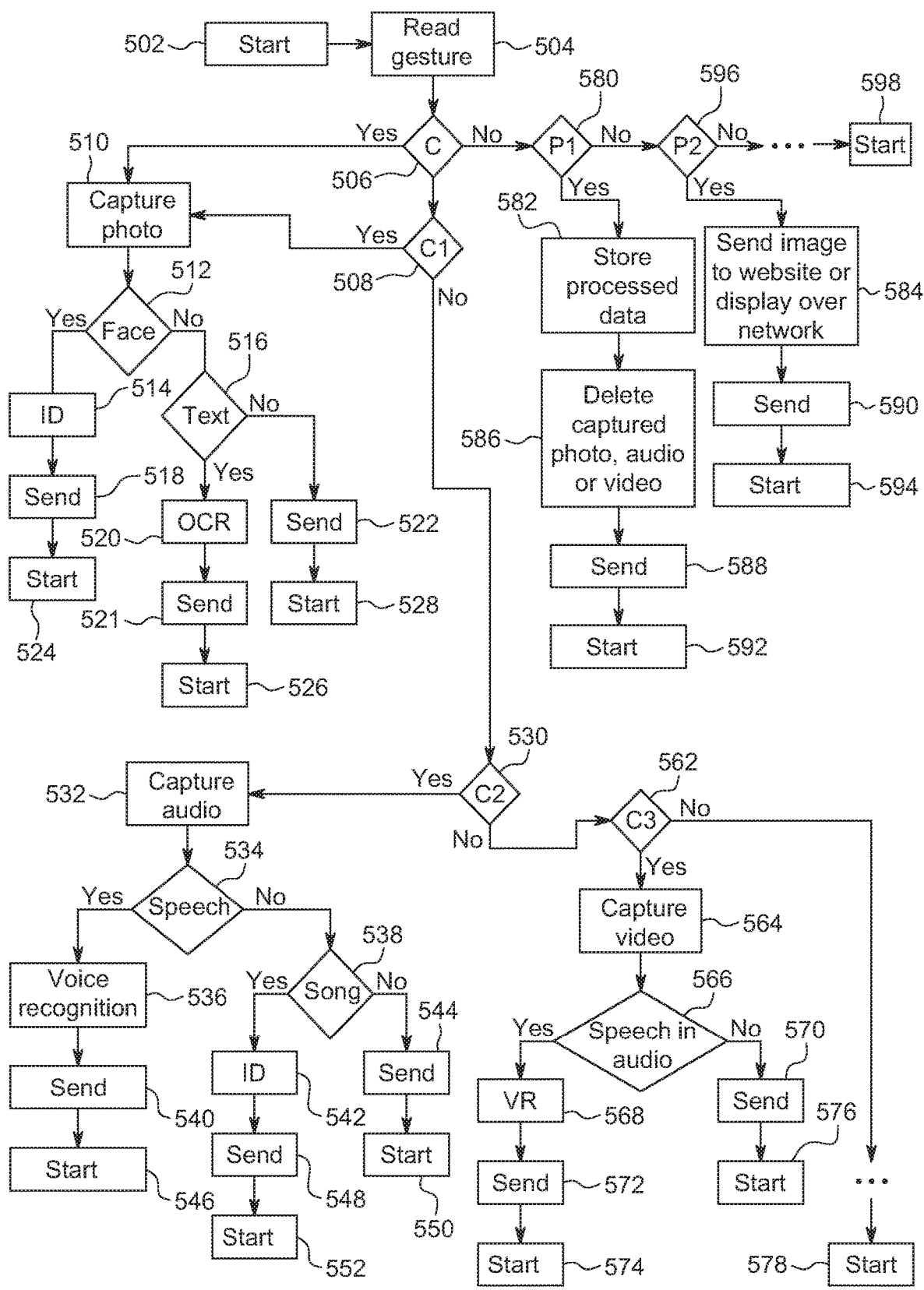
FIG. 5 shows a flow chart in connection with one embodiment of the present invention.

FIG. 5 shows a flow chart in connection with one embodiment of the present invention. Generally speaking, the decision points with respect to gestures C1, C2, and C3 show processes for capturing data based upon initiating gestures; the decision points with respect to gestures P1 and P2 show processes for processing the most recently captured data (stored in a gesture file). It will be understood that FIG. 5 shows just a few examples and that any number or types of gestures can be added to, nested in, or rearranged in FIG. 5.

The process begins at step 502 (Start). At step 504 the CPU 164 reads gesture data received from CPU 114 through a signal or signals from transmitter 108 to receiver 160 (and any necessary back-channel signals from transmitter 158 to receiver 110) to determine whether a gesture has been made. In one embodiment, CPU 164 executes the remaining steps shown in FIG. 5. But, as discussed above, the processing load can be shared between or among multiple CPUs, including CPU 114 by appending remaining steps into the gesture file. At step 506, it is determined whether a capture-gesture has been made. If a capture gesture has been made, the process proceeds to Step 508, which determines if gesture C1 has been made. If so, step 510 captures image data and preferably appends date, time, and/or geographic stamps to the capture file to form a gesture file. Step 512 determines whether the captured image includes faces. If so, step 514 identifies the faces using image processing and appends that information to the gesture file, step 518 sends the gesture file to the memory, and the processes returns to the Start 502 at step 524. If no faces are detected, step 516 determines whether the image contains text. If so, step 520 conducts optical character recognition on the image and appends that information to the capture file to form a gesture file, step 521 sends the gesture file to the memory, and the processes returns to the Start 502 at step at step 526. If no text is detected the gesture file (capture file with date, time, and/or geographic stamps) is sent to the memory at step 522, and the process returns to the Start 502 at step 528.

If gesture C1 is not detected at step 508, the processes moves to step 530. Step 530 determines if a gesture C2 has been made. If so, step 532 captures audio data and preferably appends date, time, and/or geographic stamps to the capture file to form a gesture file. Step 534 determines whether the captured audio includes speech. If so, step 536 conducts voice recognition and stores detected speech as text, step 540 sends the gesture file to the memory, and the processes returns to the Start 502 at step 546. If no speech is detected, step 538 determines whether the audio contains a song. If so, step 538 conducts pattern matching (e.g., U.S. Pat. Nos. 6,967,275; 5,857,171; 5,811,708; 6,121,530 and 5,447,438 and Japanese Publication Nos. 02235086A and 2000232761A—each of which is incorporated herein by reference) on the audio and appends that information to the capture file to form a gesture file, step 542 sends the gesture file to the memory, and the processes returns to the Start 502 at step at step 552. If no song is detected the gesture file (capture file with date, time, and/or geographic stamps) is sent to the memory at step 550, and the process returns to the Start 502 at step 560.

If gesture C2 is not detected at step 530, the processes moves to step 562. Step 562 determines if a gesture C3 has been made. If so, step 564 captures video data and preferably appends date, time, and/or geographic stamps to the capture file to form a gesture file. Step 566 determines whether the captured video includes speech. If so, step 568 conducts voice recognition and stores detected speech as text, step 572 sends the gesture file to the memory, and the processes returns to the Start 502 at step 574. If no speech is detected, the gesture file (capture file with date, time, and/or geographic stamps) is sent to the memory at step 570, and the process returns to the Start 502 at step 576.

If gesture C3 is not detected at step 562, the process undergoes any additional nested gesture determinations (indicated by ellipses . . . before step 579) and, if not, proceeds back to Start 502 at step 578.

At step 506, if a capture gesture has not been made, the process proceeds to Step 580. In this embodiment, only two types of gestures (C and P) are shown, thus no additional gesture type detection is needed. However, if more gesture types are added, step 506 will be split into a step of steps determining whether each type of gesture has been made instead of being a single yes/no determination.

Step 580 determines whether gesture P1 has been made. If so, the process proceeds to step 582 and stores the processed data in memory, then proceeds to step 586 to delete the captured raw data (e.g., raw photo file, raw audio file, or raw video file), then sends the gesture file (capture file-minus-raw-data with date, time, and/or geographic stamps) to memory at step 588, and then returns to Start 502 at step 592.

If gesture P1 is not detected at step 580, the process proceeds to step 596, which determines if gesture P2 has been made. If so, the process proceeds to step 584 and sends the image (or audio or video—not shown in FIG. 5) for display over either a network or via a website, then sends the proceeds to send the gesture file (capture file with date, time, and/or geographic stamps) to memory at step 590, and then returns to Start 502 at step 594.

If gesture P2 is not detected at step 596, the process undergoes any additional nested gesture determinations (indicated by ellipses . . . before step 598) and, if not, proceeds back to Start 502 at step 598.

What is claimed is:

1. A gesture-based data capture and analysis device, comprising:
    a display;
    a gesture unit that is configured to be affixed to one or more of a user's wrist, hand, and/or finger without the user having to hold the gesture unit and that is configured to detect two or more gestures made by the user and to send to an analysis unit gesture data related to the detection of gestures;
    a peripheral that is affixed to or carried by the user and that is configured to capture data in response to a gesture made by the user, wherein the data captured by the peripheral does not include the gesture data; and
    a feedback device that is affixed to or carried by the user and that provides a signal to the user to alert the user as to which type of gesture was detected, wherein the analysis unit is affixed to or carried by the user and is configured to:
        (a) interpret the two or more gestures based upon the gesture data,
        (b) determine whether two or more gestures are compatible with one another,
        (c) process the data captured by the peripheral based upon the interpretation of one or more gestures,
        (d) create a capture file containing the data captured by the peripheral, and
        (e) append an instruction to the capture file, wherein the analysis unit creates the instruction based upon an analysis of both the gesture data and the data captured by the peripheral, and the instruction determines how the data captured by the peripheral is to be processed.

2. The gesture-based data capture and analysis device of claim 1 wherein the analysis unit is further configured to interpret at least one gesture that initiates capture and one gesture that corresponds to the instruction.

3. The gesture-based data capture and analysis device of claim 2 wherein the instruction relates to one or more of the following: (1) a request to conduct speech recognition on the capture file, (2) a request to conduct optical character recognition on the capture file, (3) a request to conduct facial recognition on the capture file, or (4) a request to send the capture file to a recipient over a network.

4. The gesture-based data capture and analysis device of claim 1 wherein the analysis unit is further configured to interpret a sequence gesture.

5. The gesture-based data capture and analysis device of claim 1 wherein the analysis unit is further configured to interpret a contrasting gesture.

6. The gesture-based data capture and analysis device of claim 1 wherein the gesture-based data capture and analysis device is configured to detect gestures made by a user's finger.

7. The gesture-based data capture and analysis device of claim 1 wherein the gesture unit is further configured to only detect gestures after the gesture-based data capture and analysis device receives input from a user, separate from the gestures to be detected, requesting that it begin to detect gestures for a predefined period of time.

8. The gesture-based data capture and analysis device of claim 1 wherein the gesture-based data capture and analysis device is further configured to capture data in response to a gesture made by a user and process the data captured by the peripheral according to the instruction without the user having to interact with a graphical user interface to initiate the capture or the processing at the time of the capture or the processing.

9. A data capture and analysis system, comprising:
   a gesture sensing device configured to detect at least two gestures made by one or more of a user's wrist, hand, and/or finger, wherein the gesture sensing device is configured to be affixed to the user's wrist, hand, and/or finger without the user having to hold the gesture sensing device;
   one or more peripherals configured to capture data in response to one or more of the gestures, wherein the data captured by the peripheral does not include data related to the detection of the gestures;
   a feedback device that is affixed to or carried by the user and that provides a signal to the user to alert the user as to which type of gesture was detected;
   a processing unit configured to interpret the gestures based upon information provided by the gesture sensing device and to store in memory the data captured by the peripheral in the form of an electronic file;
   wherein the processing unit is further configured to:
      (a) determine whether two or more gestures are compatible with one another,
      (b) process the data captured by the peripheral based upon the interpretation of at least one of the gestures, and
      (c) write an instruction to the capture file, wherein the content of the instruction is based upon a determination as to whether two or more gestures are compatible and upon data captured by the peripheral, and the instruction determines how the data captured by the peripheral is to be processed.

10. The data capture and analysis system of claim 9 wherein the processing unit is further configured to append to the electronic file information obtained by the gesture sensing device.

11. The data capture and analysis system of claim 10 wherein the appended information identifies the type of data captured.

12. The data capture and analysis system of claim 9 wherein the appended information identifies the type of peripheral that captured the data.

13. The data capture and analysis system of claim 9 wherein the processing unit is further configured to interpret at least one gesture that initiates capture and one gesture that corresponds to the instruction.

14. The data capture and analysis system of claim 13 wherein the instruction includes one or more of the following: (1) a request to conduct speech recognition on the electronic file, (2) a request to conduct optical character recognition on the electronic file, (3) a request to conduct facial recognition on the electronic file, or (4) a request to send the electronic file to a recipient over a network.

15. The data capture and analysis system of claim 9 wherein the processing unit is further configured to interpret a contrasting gesture.

16. The data capture and analysis system of claim 9 wherein the gesture sensing device is configured to detect gestures made by a user's finger.

17. The data capture and analysis system of claim 9 wherein the gesture sensing device is further configured to only detect gestures after the data capture and analysis system receives input from a user, separate from the gestures to be detected, requesting that it begin to detect gestures for a predefined period of time.

18. The data capture and analysis system of claim 9 wherein the data capture and analysis system is further configured to capture data in response to a gesture made by a user and process the data according to the instruction without the user having to interact with a graphical user interface to initiate the capture or the processing at the time of the capture or the processing.

19. A method of capturing and processing data in response to a user gesture, comprising:
   detecting with a motion capture device a first gesture made by a user;
   in response to the first gesture, capturing data with a peripheral, wherein the captured data does not include data related to detection of a gesture;
   identifying the first gesture detected based upon gesture identifying information contained in a database or lookup table, wherein the gesture identifying information includes one or more numerical or alphanumerical identifiers;
   detecting with the motion capture device a second gesture made by the user;
   determining whether the second gesture is compatible with the first gesture;
   creating an instruction based upon the identity of the first gesture and a result of the determination of whether the second gesture is compatible with the first gesture wherein the instruction determines how captured data is to be processed; and
   processing the captured data based upon the instruction.

20. The method of claim 19 wherein a gesture detected includes a motion of the user's hands or fingers.

21. The method of claim 19 further including detecting at least one gesture that instructs a first peripheral to capture image data and a second gesture that instructs a second peripheral to capture audio data.

22. The method of claim 21 further including the steps of combining two different gestures and interpreting the combination of the two different gestures as a third gesture.

23. A gesture-based analysis device, comprising:
   an interface for receiving from a gesture-based data capture device gesture-information related to two or more gestures and for receiving from a peripheral device peripheral-information captured by the peripheral device, wherein the peripheral-information does not include the gesture-information; and
   a logic unit capable of:
      (a) interpreting both the gesture-information and the peripheral-information,
      (b) identifying gestures based upon the gesture-information, and
      (c) processing the peripheral-information based upon (i) the gesture-information, (ii) a determination as to whether two or more gestures are compatible with one another, and (iii) the peripheral-information.

24. The gesture-based analysis device of claim 23 wherein the logic unit is capable of creating a capture file containing the peripheral-information and appending the gesture-information and processing instructions to the capture file.

25. The gesture-based analysis device of claim 23 wherein the logic unit is capable of identifying in the gesture-information at least two gestures, one that initiates capture and one that corresponds to a user instruction as to where to publish the peripheral-information.

26. The gesture-based analysis device of claim 23 wherein the logic unit is capable of identifying gesture-information that relates to a contrasting gesture.

27. The gesture-based analysis device of claim 23 wherein the logic unit is capable of processing the peripheral-information according to a user instruction without the user having to interact with a graphical user interface to initiate processing at the time of the processing.

\* \* \* \* \*